UNITED STATES PATENT OFFICE.

PAUL A. STARKE AND ERIC A. STARKE, OF BERKELEY, CALIFORNIA, ASSIGNORS TO STANDARD OIL COMPANY, OF RICHMOND, CALIFORNIA, A CORPORATION OF CALIFORNIA.

PROCESS OF PURIFYING AND IMPROVING HYDROCARBON GASES.

1,206,156.  Specification of Letters Patent.  Patented Nov. 28, 1916.

No Drawing.  Application filed January 24, 1916.  Serial No. 73,781.

*To all whom it may concern:*

Be it known that we, PAUL A. STARKE and ERIC A. STARKE, citizens of the United States, residing at Berkeley, in the county of Alameda and State of California, have invented certain new and useful Improvements in Processes of Purifying and Improving Hydrocarbon Gases, of which the following is a specification.

Our invention relates to the purifying of natural gas, that is, hydrocarbon gases having the generic formula $C_nH_{2n}+2$.

The object of our invention is to increase the commercial value of natural gas by improving it both in heat units and illuminating quality.

In the treatment of natural gas in accordance with our process, its constituents, methane and its homologues, such as ethane, propane, etc., and its variable proportions of nitrogen are, with the aid of a suitable catalyzer, chemically altered by a molecular rearrangement resulting in the formation and the consequent opportunity of removal of aromatic bodies, and in the fixation of its nitrogen into cyanids and ammonia which may likewise be removed, it being understood, of course, that variation in the composition of the natural gas produces variation in the resultant products intended to be removed. More particularly is this the case with the nitrogen products, because nitrogen is not a constant constituent of natural gas, and varies greatly in different localities, ranging from 50% to a mere trace. However, the amount of nitrogen in the gas to be treated can readily be controlled by supplying it from extraneous sources as needed or desired in particular cases.

The formation and removal of the aromatic bodies, and the fixation of the nitrogen in cyanogen compounds and ammonia and their removal leaves the residual gas materially improved in thermal units and of better illuminating quality.

Our process of treating natural gas to reach the results above stated is as follows:—
We first prepare a catalyzer. The composition of this is, essentially, a metal of the iron group, an alkaline earth and an alkali. A specific example is as follows:—20% of an iron preparation, say, metallic iron or magnetic iron oxid. 40% of magnesium oxid. 40% of sodium or potassium carbonate. The iron and magnesium oxid are thoroughly mixed. The potassium or sodium carbonate is dissolved in the smallest quantity of water possible and incorporated in the iron and magnesium oxid preparation, after which the mass is kneaded into a dough and then calcined. After this the mass is granulated to about the size of linseed. The natural gas is then passed over this catalytic mass at approximately atmospheric pressure and under a degree of heat which varies according to the results desired. For example, for the formation of aromatic bodies alone, the temperature is approximately 1000° F., while for the formation and separation of cyanogen compounds and ammonia, as well, the temperature is approximately 1600° F. These temperatures may vary, and we, therefore, do not confine ourselves in this regard. After subjection to the catalyzer, the liquid constituents of the gases, namely, aromatic bodies, as, for example, naphthalene and benzene and which are valuable products in themselves, are condensed out and removed in the usual way practised in the removal of casing-head gasolene from natural gas,—that is to say, the gas being cooled after leaving the catalyzer is subjected to compression of approximately 500 lbs. to the square inch and then being allowed to expand the condensable bodies, drop out. After a certain amount of gas has passed over the catalyzer, the latter becomes inactive, because it is saturated with cyanogen, and the grains are coated with carbon. Samples may be taken at intervals and tested. When the point of saturation or inertness is reached, the catalyzer is lixiviated, and the nitrogen compounds which of themselves are valuable products are removed either as cyanids, or, by the aid of superheated steam, as ammonia, in the usual manner.

In giving the composition of the catalyzer as above stated, we are not to be limited to the specific formula expressed, because the proportion of iron and magnesium oxid may be varied considerably, while the sodium or potassium carbonate can only be added in such quantity as not to produce a fusible mass. If too much alkaline carbonate is added the mass will sinter, and thereby prevent further action.

Instead of magnesium oxid, calcium oxid may be substituted as the alkaline earth component; but this will necessitate an increase in temperature.

Instead of iron, some other member of the iron group, such as nickel or cobalt may be used, but we have found that iron is best suited, and that the best forms of this are pure metallic iron, reduced by the alcohol process, or the magnetic iron-oxid. While these give the best results, yet all forms of iron or its combination possess some catalytic effect in conjunction with magnesium oxid.

For the alkali component, the metal sodium may be used. But, when, as in the formula given, a combination of sodium or potassium is used in the catalyzer it should be such combination as will be decomposed by the cyanogen at elevated temperatures to form cyanids. For example, sodium borate or silicate cannot be used, for these will not form cyanids; nor can sodium sulfate be employed, as this will form sulfocyanid because sodium sulfid absorbs cyanogen.

The original composition of the natural gas can also be altered in the matter of its nitrogen content. Within certain limits, it may be possible to add nitrogen to it, if this element should be present only in small quantity. However, this addition of nitrogen is only possible to a limited extent, and no more can be added than it is possible to remove through the medium of the catalyzer, as, otherwise, the residual gas will have a composition unfitting it for use as a merchantable illuminate; and this would contravene our object, for it must be borne in mind that by our process we seek to improve the commercial value of natural gases, by the formation first of aromatic bodies and nitrogen compounds and then their removal. This cannot be done, if air nitrogen be added indiscriminately or injudiciously.

We prefer to work with a nitrogen content of about 10%, as this will leave the residual gas in a high state of purity, and at the same time will give a good yield of nitrogen product. We find that after the natural gas has been treated by our process, the thermal units in the residual gas have been materially increased, and it, therefore, has a greater value than the original gas. Of this we give the following example: The natural gas of the midway district in California is generally composed of upward 90% methane, 3% nitrogen, 4% carbon dioxid and 3% heavy hydrocarbons. The specific gravity is 0.7; air 1. After the gas has been treated by our process, the residual gas has a composition as follows:—

Acetylene _____ 30.00
Carbon monoxid _____ 20.00
Hydrogen _____ 10.00
Methane _____ 40.00

Specific gravity 0.9; air 1. This residual gas is thus more valuable than the original gas, and it can, if desired, be mixed with other natural gas or with producer gas to improve the lighting effect in which these gases are generally deficient.

The composition of the residual gas which we have given above as an example, is merely one of the many phases of the catalytic reaction which takes place when impure methane is acted upon by carbonate of soda or potassium. The large amount of carbon monoxid indicated is due to the reaction between methane and the carbon dioxid in the sodium or potassium carbonate and the considerable percentage of $CO_2$ which frequently is a constituent of impure natural gas. At the beginning of the reaction, the analysis given is a fair example of the exit gas, but as the alkali carbonates are nearing saturation, it naturally follows that the composition changes, the exit gas being then composed principally of hydrogen, methane, acetylene and aromatic hydrocarbons with small percentages of CO and the nitrogen which has not been absorbed.

We claim:

The process of purifying and improving hydrocarbon gases of the generic formula $C_nH_{2n}+2$, which consists in passing them over a catalytic mass composed of a metal of the iron group, an alkaline earth and an alkali, under approximately atmospheric pressure and at a temperature ranging between 1000 degrees Fahr. and 1600 degrees Fahr., approximately, whereby aromatic bodies and nitrogen compounds are formed and the latter separated out; and then subjecting them, after cooling, to a pressure of approximately 500 pounds to the square inch and allowing them to expand whereby the aromatic bodies are separated, leaving the residual gas improved in thermal units and illuminating quality.

In testimony whereof we have signed our names to this specification in the presence of two subscribing witnesses.

PAUL A. STARKE.
ERIC A. STARKE.

Witnesses:
  WM. F. BOOTH,
  D. B. RICHARDS.